June 5, 1962 V. A. NAVIKAS 3,037,474
METHOD OF MAKING A FOAMED PLASTIC LINED CROWN
Filed June 6, 1958
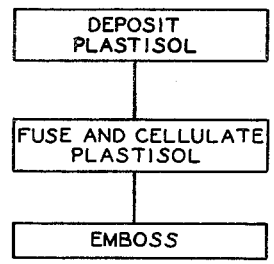
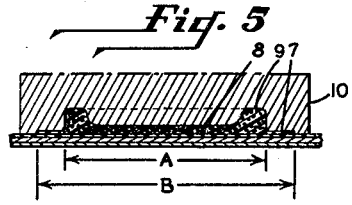
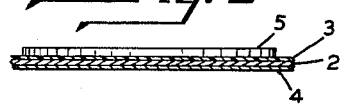
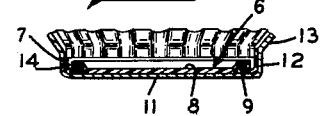
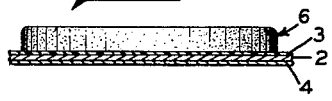
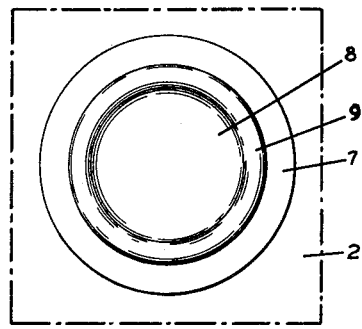
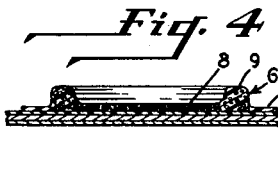
INVENTOR
VICTOR A. NAVIKAS
ATTORNEY 3,037,474
METHOD OF MAKING A FOAMED PLASTIC
LINED CROWN
Victor A. Navikas, Lancaster Township, Lancaster County, Pa., assignor to Armstrong Cork Company, Lancaster, Pa., a corporation of Pennsylvania
Filed June 6, 1958, Ser. No. 740,394
10 Claims. (Cl. 113—80)

This invention relates to a method of making foamed plastic lined crowns. It is concerned more particularly with a method of making a crown closure by forming a foamed plastic liner on the flat metal sheet from which the closure shell is to be formed and then punching and forming the closure shell with the liner disposed in position and bonded to the closure shell.

Closures have been produced by forming the crown shells and depositing plastic liner compositions therein. Customarily this has been accomplished by depositing a resin plastisol composition in fluid form within the closure shell and distributing the plastisol over the inner head surface of the shell by a spinning or centrifugal action or by the use of heated forming plungers.

While resin plastisol lined crowns possess physical characteristics which are suitable for sealing new bottles with perfect sealing lips, they are lacking in suitable characteristics to seal slightly chipped or otherwise damaged or defective bottles which ordinarily would be effectively sealed with the conventional cork composition sealing liner. Since most beverage bottlers reuse their bottles and since the bottle lips are subject to chipping and other damage, plastic lined crowns have not met with the expected trade acceptance because of sealing failures which result in loss of carbonation of the bottled products.

A substantial proportion of bottles with damaged sealing lips has been found to be properly sealable with a crown closure only if the crown lining material is pressed against the outer periphery of the sealing lip when the crown is crimped into place on the bottle. This result is achieved when the lining composition is resilient and compressible as is cork composition, for the liner which is held against substantial axial outward displacement by the metal shell will flow and conform to the surface of the bottle lip, filling in irregularities and forming a liquid and gas-tight seal.

An object of the invention, therefore, is to provide a method of making crown closures with a foamed plastic liner, the sealing characteristics of which will be similar to those of high quality cork composition lined crowns.

Another object of the invention is to provide a method of forming plastic lined crowns with a foamed liner composition which will provide the proper sealing characteristics for use on new bottles with good sealing lips and on the usual reused bottles having chipped or otherwise damaged sealing lips which are capable of being resealed but only by a sealing liner possessing good resilience and compression characteristics.

Another object of the invention is to provide a method of forming foamed plastic lined crowns which will seal against the outer periphery of the sealing lip of the container as well as the top lip surface.

An additional object of the invention is to provide a method of making crown closures with foamed liners in which the liner is formed and contoured on a flat sheet of metal crown plate prior to closure shell formation.

Other objects of the invention will be clear from consideration of the following description of an embodiment of the invention which will be given in conjunction with the attached drawng, in which:

FIGURE 1 is a flow diagram of the process;
FIGURES 2, 3, and 4 are views, partially in section, showing the steps of the flow diagram of FIGURE 1;
FIGURE 5 is a sectional view illustrating the embossing step and showing the relationship of the embossing die to the closure components;
FIGURE 6 is a sectional view of a completed crown closure; and
FIGURE 7 is a top plan view of a portion of a metal crown plate showing an embossed and contoured liner thereon prior to formation into a crown closure.

According to the present invention, a flat sheet or metal crown plate has deposited thereon a fluid thermoplastic resin plastisol composition which has incorporated therein a cellulating agent which is effective upon the application of heat to liberate a gas within the plastisol and form a foamed, cellular product essentially all of the cells of which are closed. Plastisols are formed of fine particles of resin, generally a vinyl resin such as polyvinyl chloride or a copolymer of vinyl chloride and vinyl acetate, dispersed in a liquid plasticizer, such as dioctyl phthalate. The mixture is of a pastelike consistency at temperatures below the fusion temperature of the resin and plasticizer and may be applied to surfaces by printing with conventional screen printing equipment, roll coating equipment, or the like. Upon heating, the resin is first partially solvated by the plasticizer, and gelling results. Continued heating results in fluxing of the resin-plasticizer system, and a permanent rubbery composition results upon cooling. Preferred practice, therefore, is to accomplish cellulation during the step of fusing the plastisol. The liner composition is permitted to expand freely, that is, there is no confinement of the mass during cellulation. Expansion occurs principally in an upward direction with only minor lateral expansion. Generally, an increase in the order of 3 to 5 times the wet thickness of the plastisol will provide the desired resiliency and compressibility in the liner. This will vary with closure size. With conventional crown closures for a 26 mm. beverage bottle finish, a liner about 0.040" thick after cellulation has been found to provide excellent sealing qualities. The fused and cellulated liner preferably is embossed to collapse the cells and form more dense areas in the liner for special purposes as will be more fully explained. Subsequently, the metal plate with the foamed plastic liner joined thereto is sheared into a disk and formed into a completed crown closure.

In the embodiment of the invention shown in FIGURES 2–7 of the drawing, the thermoplastic resin liner composition in the form of a plastisol is deposited as a disk onto a flat sheet of metal crown plate 2, such as a sheet of 100-pound tin-plated steel about 27" x 34½", which sheet has a priming and bonding coating of vinyl lacquer 3 applied thereto. A suitable vinyl chloride-phenolic lacquer such as Stoner Mudge Company's S–1325F lacquer may be used. These so-called sanitary lacquers are well-known in the art and need no further description, for the method of the present invention is not concerned with the use of any particular priming and bonding lacquer or other coating. It is preferred, of course, to use a vinyl chloride resin lacquer where a vinyl chloride resin plastisol is to be used in the formation of the crown liner.

The metal crown plate 2 generally is provided on the flat face opposite to the surface to which the priming and bonding coating 3 is applied with a decorative or protective coating 4. Generally, this is a conventional lithographic decoration applied to the flat sheet of metal crown plate. However, the plate may be uncoated or undecorated or the coating may be plain and clear or in the form of a colored protective coating composition. In some cases, crowns are made with plain exposed tin plating constituting the outer surface.

The plastisol lining composition is preferably deposited onto the metal crown plate in a printing operation, such as by a screen printing unit. The deposits are preferably in the form of a plurality of disks which are positioned in spaced relationship on the metal crown plate to coincide with the decoration on the other side. For example, with a sheet of metal crown plate 27″ x 34½″, as mentioned above, the liner disks may be positioned in 20 rows, with 22 liner disks in each row to provide 440 disks on each plate. In the embodiment shown in FIGURE 2, the deposit of plastisol lining composition is in the form of a circular disk 5.

As noted in the drawing, the disk is of generally uniform thickness throughout, although it is recognized that in any screen printing process where a squeegee is used to deliver the material to be printed and to press it through the screen, variations in thickness are inevitable, particularly where a relatively thick layer of material is printed through the screen. Where it is desired to have the lining material extend at least partially up the skirt wall of the closure, as shown in FIGURE 6, the diameter of the liner disk 5 will be somewhat greater than the inner diameter of the head wall of the crown shell as finally formed. With conventional beverage bottle crowns, the inner head wall of the shell is slightly greater than 1″ in diameter, generally about 1.050″, and the liner disks may be about 1¼″ in diameter as formed on the crown plate.

As mentioned above, the liner disks are formed of a thermoplastic resin plastisol, and the vinyl resin plastisols are preferred. Vinyl resin plastisols are well-known in the art and are commercially available products. The following example is typical of many suitable plastisol compositions. It has been modified to incorporate a cellulating agent.

*Example I*

| | Parts by weight |
|---|---|
| Marvinol VR 50 (polyvinyl chloride in fine powder form) | 100 |
| Dioctylphthalate (plasticizer) | 80 |
| Stayrite 90 (calcium stearate) lubricant and stablizer | 3 |
| $TiO_2$ pigment | 5 |
| Lamp black pigment | 0.5 |
| Cellogen [p,p′-oxy-bis-(benzene sulfonyl hydrazide)] cellulating agent | 7 |

Other thermoplastic resin plastisols may be used in place of the vinyl chloride resin plastisol of the above example. Goodrich Rubber Company's Pliovic AO, which is a polyvinyl chloride resin plastisol, may be used. It contains about 95% vinyl chloride and 5% vinyl acetate or other internal plasticizer in the copolymer. The method obviously will be applicable to any thermoplastic resin plastisol, although as mentioned above, the vinyl resin plastisols are most commonly known and are ideally suited for food and beverage closure use because they are tasteless and odorless when fused and they possess good sealing properties.

In a typical liner, the wet thickness of the disk 5 may be about .011″. The diameter of the disk will depend upon the area of the crown shell to be covered by the lining composition; and where, as mentioned above, it is desired to have the composition extend up the skirt, the diameter will be greater than where the liner is to terminate at the juncture line between the head of the closure and the skirt wall. The lining composition may be applied so as to cover all of the skirt of the crown shell as well as the head portion, if desired.

In the next step of the process, heat is applied to the plastisol composition to fuse and to cellulate the plastisol and to bond it firmly to the metal plate 2 through the intermediary of the priming and bonding coating 3. This heating may be accomplished by passing the sheets with the applied disks thereto through a conventional metal decorating oven where heated air is applied to the sheets. Rapid and uniform heating of the disks to a temperature of about 350° F. with the composition of the above example is required to effect the desired cell formation and fusion of the plastisol composition. The Cellogen liberates its gas at a temperature below 350° F. which is about the fusion temperature of the plastisol. It is desirable to sufficiently solvate and gel the plastisol that adequate film strength will be developed therein as gas is liberated from the Cellogen so that relatively small and uniformly distributed cells will be formed within the liner composition. In actual practice, with disks of a composition as set forth in Example I, an oven temperature of 375° to 425° F. (air temperature) has been found to be acceptable with sheets of the size mentioned above passing through the oven in 3½ to 4 minutes.

While crowns can be formed from the metal plate with the expanded cellulated liner disks thereon, after suitable cooling of the plasticized thermoplastic resin which results from fusion of the plastisol components to form foamed, resilient, and conformable liner disks, preferred practice is to emboss the cellulated liner composition in selected areas for special purposes. In the embodiment shown in FIGURE 4, the outer periphery of the cellulated liner disk 6 of FIGURE 3 has been embossed in an annular area as indicated at 7. This embossing extends generally outwardly from what will be the line of juncture between the head wall and skirt wall of the closure shell when the metal plate is formed into a crown closure shell.

The width of the ring 7 will depend upon the portion of the skirt to be covered by the composition. As indicated above, it is preferred to have this ring extend sufficiently far out so that when the crown closure is formed and applied to a bottle, for instance, the portion 7 will lie in engagement with the outer portion of the sealing lip of the bottle and thus more effectively seal bottles which may have minor chips or other imperfections therein. Embossing in this ring area 7 also facilitates formation of the completed crown closures from the prelined crown plate. In conventional crown presses, the crown plate is first sheared into a circular disk; and while the disk is slidingly engaged at its periphery, a punch presses the disk into a former, i.e. a forming tool having a crimped outer periphery corresponding to the contour to be formed in the skirt of the crown shell. When a layer of rubbery sealing liner composition is formed on the metal crown plate prior to crown shell formation, if it extends over the portion of the metal crown plate which will form the skirt of the closure, it will be necessary to increase the dimensions of the former to take care of the increased thickness of material disposed in the skirt area of the crown during formation. With an embossed ring about 0.011″ to 0.013″ thick, the inside diameter of the former may be increased by 0.025″. If the ring 7 were not formed and a 0.040″ thickness of liner composition were disposed over the skirt portion, it would be necessary to increase the inner diameter of the former by 0.060″. This would drastically alter the basic dimensions of the crown and probably would require changes in the feeding equipment used by bottlers to deliver crowns to their bottle sealing units.

The central portion 8 of the liner also may be embossed and the cells collapsed in that area. As shown in FIGURE 4, this embossing may be to a lesser depth than the embossing in the ring area 7. This enhances the appearance of the closure and also disposes the sealing composition in this area 8 below the level at which the projecting edges of other crowns normally will engage it in a hoppering operation, for example. Also, by densifying the liner in this area, the composition may be made more resistant to passage of liquids or gases to the inner head wall of the closure shell.

The preferred practice is to emboss both the area 8 and the ring 7 and to provide thereby a sealing rib 9 disposed as an upstanding annular projection confined on both sides by areas of collapsed material of greater density. This enhances the sealing action which is achieved when the closure is used to seal carbonated beverages particularly. As noted in FIGURE 5, the embossing punch 10 which contours the expanded liner composition preferably forms the central depression 8 and an annular ring 7, the inner diameter A of which is about equal to or slightly less than the inner diameter of the head wall of the closure shell when formed. The outer diameter B of the ring is preferably such that the sealing liner will extend at least part way up the skirt of the closure so as to engage the outer portion of the container lip when the crown closure is applied to and crimped on the container. It is preferred to limit the width of the ring 7 so that the sealing liner composition does not extend to the outer edge of the crown skirt, for this might interfere with proper feeding of the crowns in the bottle-capping machine.

While it is preferred to effect the embossing operation immediately after the fusing and cellulation of the liner composition and while it is still in heated condition, this operation may be carried out after the sheets carrying the liner composition have been cooled. This practice is desirable particularly where the depositing of the plastisol and the fusing and cellulation of it are effected in a production line which supplies a plurality of crown forming presses. In such event, the fused and cellulated plastisol may be cooled to room temperature on the metal plate and the plates stacked for feeding to an embossing press mounted in tandem with each of the shell forming presses. Generally, the embossing press will be arranged to act upon all of the disks on a single sheet at one time, such as the 440 disks on the sheet mentioned above. Preferably, the platen of the embossing press upon which the metal sheet rests during embossing will be heated, and the embossing heads likewise will be heated. The temperatures employed will depend upon the plastisol composition, the dwell time available for operation upon a complete sheet, and other variable factors. For instance, with a dwell time of 7 seconds with the composition of Example I, the embossing press platen may be heated to about 275° F. and the embossing heads to about 375° F. Actually, embossing can be effected at much lower or higher temperatures. The temperature of the embossing heads preferably is in the order of 375° F. to 400° F. At temperatures substantially below 375° F. and a short dwell time, in the order of 7 seconds, embossing to a desired contour will be difficult with such short dwell time; and at temperatures substantially above 400° F., decomposition of the liner composition is likely to occur with a fused vinyl resin plastisol composition. The supporting plate temperature preferably is in the order of 275° F. to 300° F. Lower temperatures may be used where a long dwell period is available. For example, with a dwell period of 15 seconds, satisfactory embossing can be achieved with an embossing plate temperature in the order of 150° F. and a supporting plate temperature of about 130° F.

It may be necessary or desirable with some plastisol compositions and some embossing tools to provide a film of lubricant between the embossing tool and the liner composition to prevent the liner from sticking to the embossing tool. This may be accomplished by coating the upper surface of the fused and cellulated disks with a silicone oil such as Dow-Corning silicone D-200, a dimethyl silicone oil described on page 37 of the book, Silicones and Their Uses, published by McGraw-Hill Book Company, copyright 1954. The lubricant coating may be applied by a felt covered roll. The heated embossing tools may be flash lubricated by spraying, if desired.

FIGURE 6 shows a completed crown closure which is formed by shearing a circular disk from the metal crown plate of FIGURE 4 with the contoured liner 6 disposed in the center of the disk. A conventional crown forming press may be used. Such presses are double-acting and first shear circular disks from the metal crown plate; and while these disks are held in position, forming plungers press the disks into contoured forming dies which crimp the skirts of the shells to the desired contour, as previously mentioned. Generally, a whole row of crowns is formed upon each stroke of the press. It will be noted in FIGURE 6 that the liner 6 covers the entire inner head wall 11 of the crown shell and that the ring 7 of sealing material forming an edge sealing flange is disposed over a portion of the skirt 12 of the shell below the crimped terminal edge 13. Annular sealing bead 9 projects from the main body of the liner and is positioned to engage the lip of the container to which the crown is applied. This sealing bead 9 preferably is disposed so as to provide a very slight clearance, as indicated at 14, between its outer periphery and the axially projecting portion of the ring 7 which is secured to skirt wall 12 of the crown shell. The liner is bonded to the shell throughout by the inherent adhesiveness of the fused plastisol composition or by bonding and priming coating 3 or by both.

By the present invention, crown closures with foamed plastic liners may be formed without expensive liner assembly equipment and with conventional shell forming tools and presses. The finished closure will have sealing characteristics equal to those of the best cork composition lined crowns.

I claim:

1. A method of making crown closures including a metal shell and a foamed plastic liner having a foamed and expanded portion for engagement with the top of the sealing lip of a container to be sealed and a portion with collapsed cells for engagement with the side wall of said sealing lip, the steps comprising depositing a fluid thermoplastic resin plastisol having intimately incorporated therein a heat-activatable cellulating agent upon a flat sheet of metal crown plate over an area corresponding to the inner head wall of a closure shell to be formed from said metal crown plate and a portion at least of the skirt wall of said closure shell, heating said plastisol to fuse the same and activate said cellulating agent while permitting free expansion of said plastisol to form an expanded foamed resilient liner therefrom essentially all of the cells of which are closed and to bond said liner to said flat sheet of metal crown plate, collapsing the cells of said expanded liner in said skirt wall area by the application of heat and pressure thereto to define an annular body of collapsed liner composition adjacent to the expanded cellular liner portion in said head wall area of said closure shell, and then forming said composite metal plate and liner into a crown closure with a sealing liner disposed with the closure shell having a foamed portion for engagement with the top of the sealing lip of a container to be sealed and a portion with collapsed cells for engagement with the side wall of said sealing lip.

2. A method of making crown closures including a metal shell and a foamed plastic liner, the steps comprising depositing a fluid thermoplastic resin plastisol having intimately incorporated therein a heat-activatable cellulating agent upon a flat sheet of metal crown plate as a disk corresponding substantially in diameter to the inner diameter of the head wall of a crown shell to be formed from said metal crown plate, heating said plastisol to fuse the same and activate said cellulating agent to form an expanded foamed resilient liner therefrom essentially all of the cells of which are closed and to bond said liner to said flat sheet of metal crown plate, and then forming said composite metal plate and liner into a crown closure with said sealing disk of expanded cellular material disposed at the inner head surface of said closure shell.

3. A method of making crown closures including a metal shell and a foamed plastic liner, the steps comprising printing a fluid thermoplastic vinyl resin plastisol having intimately incorporated therein a heat-activatable cellulating agent upon a flat sheet of metal crown plate as a disk of greater diameter than the inner diameter of the head wall of a crown shell to be formed from said metal crown plate, heating said plastisol to fuse the same and activate said cellulating agent to form an expanded foamed resilient liner therefrom essentially all of the cells of which are closed and to bond said liner to said flat sheet of metal crown plate, collapsing the cells of said expanded liner in the area thereof which extends beyond said inner head wall by the application of heat and pressure thereto to form a thin annular ring of dense liner composition for disposition as an edge sealing flange, and then forming said composite metal plate and liner into a crown closure with said liner disposed within the closure shell over the inner head surface thereof and an edge sealing flange disposed over a portion at least of the inner surface of the skirt of the closure shell.

4. A method of making crown closures including a metal shell and a foamed plastic liner with an upstanding bead of foamed plastic composition defined on its outer perimeter by an edge sealing flange and on its inner perimeter by a noncellular recessed portion, the steps of claim 6 in which said recessed portion is formed simultaneously with said flange by the application of heat and pressure to said expanded liner.

5. A method of making crown closures including a metal shell and a foamed plastic liner, the steps comprising depositing against the head wall portion at least of a metal crown closure shell a liner forming composition comprising a fluid thermoplastic resin plastisol having intimately incorporated therein a heat-activatable cellulating agent, forming relatively small closed cells within said plastisol liner composition by heating the same rapidly and uniformly to about 350° F. while permitting free expansion of said plastisol to first partially solvate said plastisol to gel the same and impart film strength thereto, and second to liberate gas from said cellulating agent into the partially gelled plastisol, and third to fuse the cellulated material, and then cooling the cellulated material to form a sealing liner of foamed thermoplastic resin composition of a tough, yielding, and resilient character and then forming said composite metal shell and liner into a crown closure with said sealing disk of expanded cellular material disposed at the inner hear surface of said closure shell.

6. A method of making crown closures, the steps of claim 5 wherein the plastisol consists essentially of a vinyl chloride resin in finely divided form together with a liquid plasticizer for the resin which forms a fluid, pastelike composition.

7. A method of making crown closures, the steps of claim 5 in which the cellulating agent consists essentially of p,p'-oxy-bis-(benzene sulfonyl hydrazide).

8. A method of making crown closures, the steps of claim 1 in which the collapse of the cells of the expanded liner is effected by applying heat to the metal plate and to the expanded liner during the application of pressure to the liner.

9. A method of making crown closures, the steps of claim 8 in which the temperature of the liner is elevated to about 275° to 300° F. during said collapsing of the cells of the liner.

10. A method of making crown closures, the steps of claim 4 wherein a film of lubricant is interposed between the foamed liner and the annular collapsing surface.

References Cited in the file of this patent

UNITED STATES PATENTS

| | | |
|---|---|---|
| 1,956,012 | Egan | Apr. 24, 1934 |
| 2,238,681 | Dorough | Apr. 15, 1941 |
| 2,389,761 | Burgeni | Nov. 27, 1945 |
| 2,444,978 | Cooke | July 13, 1948 |
| 2,516,647 | Rogers et al. | July 25, 1950 |
| 2,663,908 | Maier et al. | Dec. 29, 1953 |
| 2,663,909 | Maier et al. | Dec. 29, 1953 |
| 2,743,931 | Pooley et al. | May 1, 1956 |
| 2,834,498 | Olt et al. | May 13, 1958 |

UNITED STATES PATENT OFFICE
CERTIFICATE OF CORRECTION

Patent No. 3,037,474                          June 5, 1962

Victor A. Navikas

It is hereby certified that error appears in the above numbered patent requiring correction and that the said Letters Patent should read as corrected below.

Column 1, line 69, for "drawng" read -- drawing --; column 7, line 21, for the claim reference numeral "6" read -- 3 --; column 8, line 4, for "hear" read -- head --; line 24, for the claim reference numeral "4" read -- 1 --.

Signed and sealed this 16th day of October 1962.

SEAL)

Attest:

RNEST W. SWIDER
Attesting Officer

DAVID L. LADD
Commissioner of Patents